Patented May 22, 1923.

1,456,486

UNITED STATES PATENT OFFICE.

CATHERINE M. HEMEN, OF WASHINGTON, DISTRICT OF COLUMBIA.

COMPOUND FOR CLEANING ALUMINUM.

No Drawing. Application filed August 7, 1919, Serial No. 315,948. Renewed October 4, 1922. Serial No. 592,443.

*To all whom it may concern:*

Be it known that CATHERINE M. HEMEN, citizen of the United States, residing at Washington, District of Columbia, has invented certain new and useful Improvements in Compounds for Cleaning Aluminum, of which the following is a specification.

My invention relates to cleaning compositions and refers particularly to a composition for cleaning aluminum or other metals of a similar character.

One object of my invention is the production of a cleaning composition which can be produced at a low price and supplied in cake or powdered form and which will prove highly efficient for the purpose designed.

To attain the object stated, my invention consists of a cleaning composition composed of ingredients in proper proportions as herein described.

In making a determined quantity of my composition I use 1 lb. white castile soap, 1 oz. oxalic acid, 1 oz. sal ammoniac, 1 oz. zinc oxide, 1 oz. bicarbonate of soda, ¼ oz. gum tragacanth, 6 qts. aq-pura-soft, and a sufficient quantity of bolted flour, pumice, rotten stone or other fine abrasive to permit the mixed composition to be made into powder, or to be formed into molded cakes.

The ingredients are thoroughly mixed and may be used in the form of a powder or molded into cakes, the composition being applied to the aluminum or other metal capable of treatment by the use of a sponge or cloth, the effect being to entirely clean the metal without damage or wear.

The main ingredients of the composition, which are white castile soap; oxalic acid; gum tragacanth; water and flour, rotten stone or pumice may be used to produce an efficient composition as such ingredients combine perfectly, the gum tragacanth acting as a binder and the flour serving to harden the composition to produce a powder or cakes while the white castile soap and oxalic acid serve as the cleaning medium of the composition.

I claim:

A cleaning composition formed of one pound white castile soap, one ounce oxalic acid, one ounce zinc oxide, one ounce bicarbonate of soda, one-fourth ounce gum tragacanth, six quarts of soft water, together with a sufficient quantity of a fine abrasive to hold the materials in a mixture.

In testimony whereof I affix my signature.

CATHERINE M. HEMEN.